United States Patent
Seo et al.

(10) Patent No.: US 9,750,036 B2
(45) Date of Patent: Aug. 29, 2017

(54) METHOD AND APPARATUS FOR RECEIVING DOWNLINK SIGNALS IN WIRELESS COMMUNICATION SYSTEM

(71) Applicant: LG ELECTRONICS INC., Seoul (KR)

(72) Inventors: Inkwon Seo, Anyang-si (KR); Hyukjin Chae, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 14/651,977

(22) PCT Filed: Dec. 2, 2013

(86) PCT No.: PCT/KR2013/011051
§ 371 (c)(1),
(2) Date: Jun. 12, 2015

(87) PCT Pub. No.: WO2014/092364
PCT Pub. Date: Jun. 19, 2014

(65) Prior Publication Data
US 2015/0327281 A1    Nov. 12, 2015

Related U.S. Application Data

(60) Provisional application No. 61/737,110, filed on Dec. 14, 2012.

(51) Int. Cl.
*H04W 72/08* (2009.01)
*H04W 72/04* (2009.01)
*H04J 11/00* (2006.01)

(52) U.S. Cl.
CPC ......... *H04W 72/082* (2013.01); *H04J 11/004* (2013.01); *H04J 11/005* (2013.01); *H04W 72/042* (2013.01)

(58) Field of Classification Search
None
See application file for complete search history.

(56) References Cited

U.S. PATENT DOCUMENTS 9,398,572 B2 * 7/2016 Zhu ................ H04W 28/0268
2010/0309861 A1 * 12/2010 Gorokhov ............ H04B 1/7103
370/329

(Continued)

FOREIGN PATENT DOCUMENTS

WO    WO 2011/052869 A1    5/2011
WO    WO 2012/109542 A1    8/2012

OTHER PUBLICATIONS

Intel Corporation, "Analysis of ePDCCH ICIC," 3GPP TSG RAN WG1 Meeting #68bis, R1-121535, Jeju, Korea, Mar. 26-30, 2012, 4 pages.

*Primary Examiner* — Phirin Sam
*Assistant Examiner* — Faiyazkhan Ghafoerkhan
(74) *Attorney, Agent, or Firm* — Birch, Stewart, Kolasch & Birch, LLP

(57) ABSTRACT

One embodiment of the present invention relates to a method by which a terminal receives downlink signals in a wireless communication system. The method for receiving downlink signals include the steps of: receiving information related to an interference signal from a serving cell; and removing interference from a pair of physical resource blocks (PRBs) used for transmitting the downlink signal, wherein the information related to the interference signal includes each use of the PRB pair in a neighboring cell of the serving cell and, when the use is an EPDCCH, an EPDCCH transmission type.

12 Claims, 12 Drawing Sheets

(56) References Cited

U.S. PATENT DOCUMENTS

| | | | |
|---|---|---|---|
| 2012/0082022 A1* | 4/2012 | Damnjanovic | H04J 11/005 370/201 |
| 2012/0281683 A1* | 11/2012 | Falconetti | H04J 11/0023 370/336 |
| 2013/0208604 A1* | 8/2013 | Lee | H04L 25/0226 370/252 |
| 2013/0215842 A1* | 8/2013 | Han | H04W 72/042 370/329 |
| 2013/0242817 A1* | 9/2013 | He | H04W 28/0268 370/280 |
| 2013/0242885 A1* | 9/2013 | Zhu | H04W 28/0268 370/329 |
| 2013/0301434 A1* | 11/2013 | Krishnamurthy | H04L 1/0026 370/252 |
| 2014/0098754 A1* | 4/2014 | Luo | H04L 5/0053 370/329 |
| 2015/0303958 A1* | 10/2015 | Davydov | H04W 72/12 375/341 |

\* cited by examiner

FIG. 6
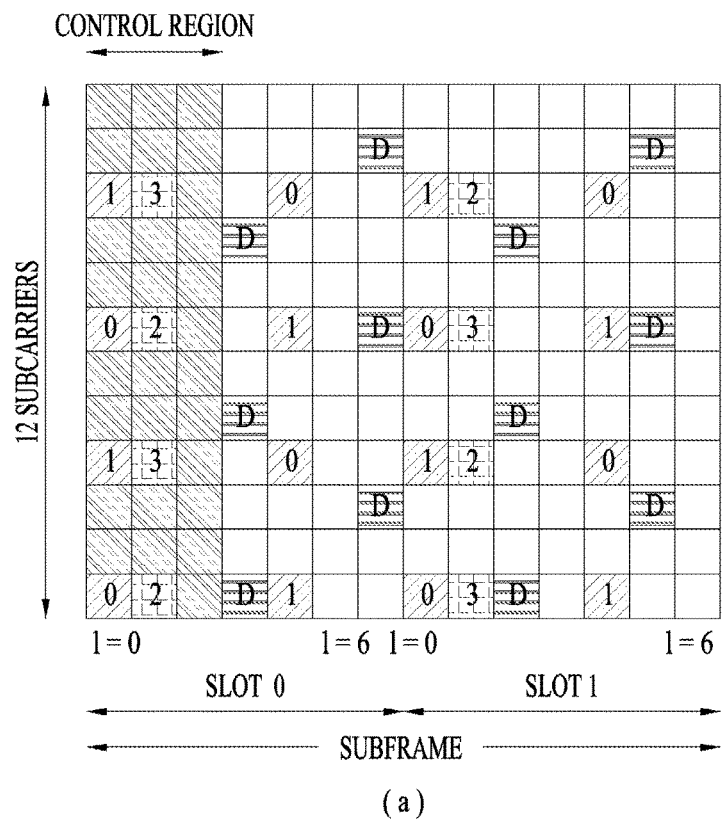
(a)
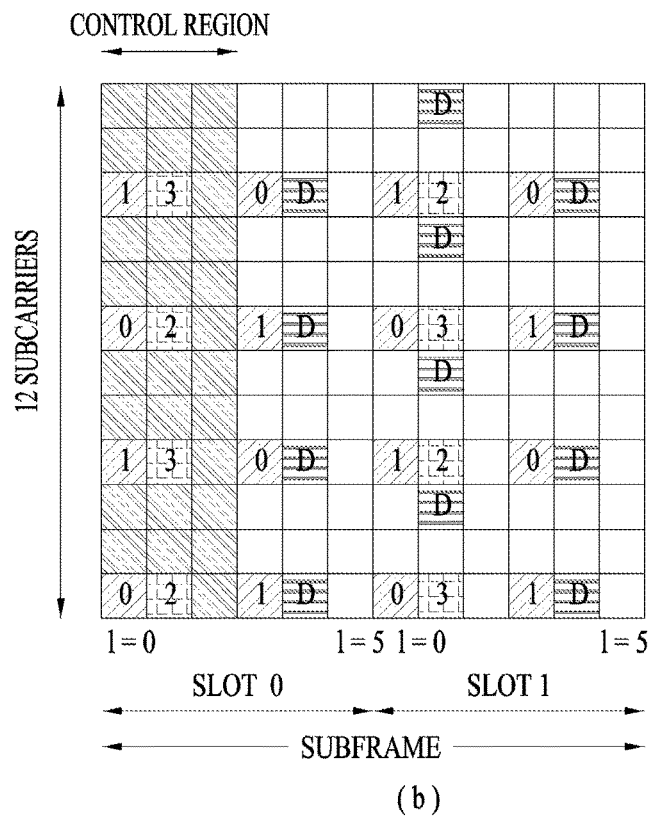
(b)

FIG. 7
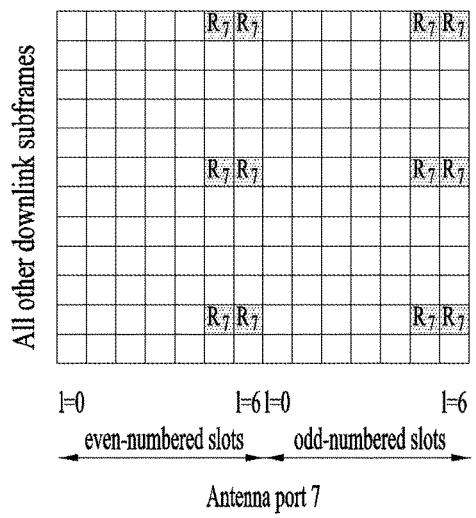
Antenna port 7
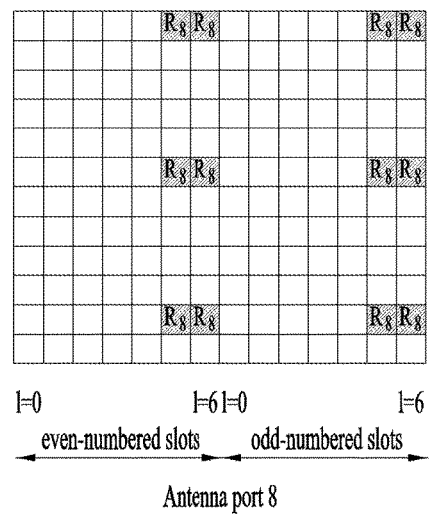
Antenna port 8
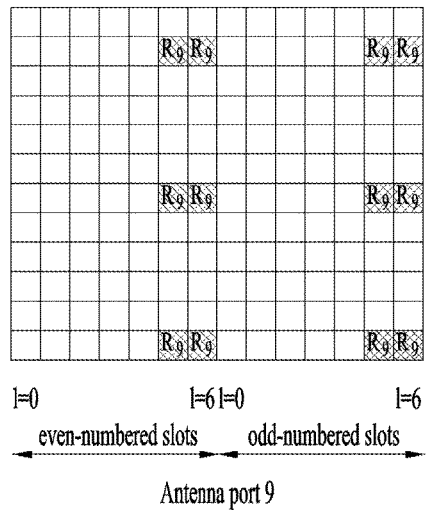
Antenna port 9
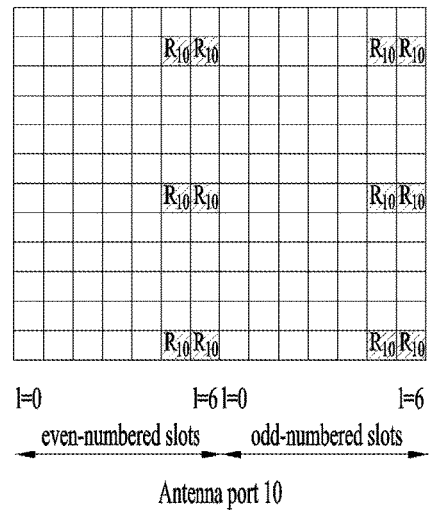
Antenna port 10

FIG. 9
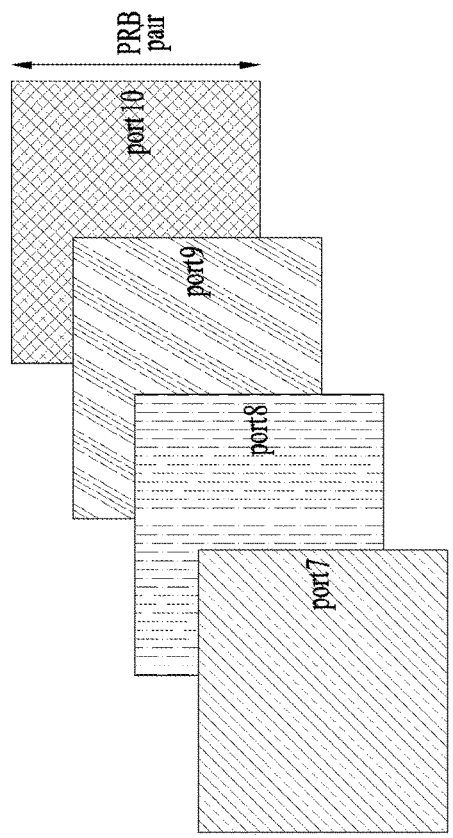
(b) PDSCH to AP mapping
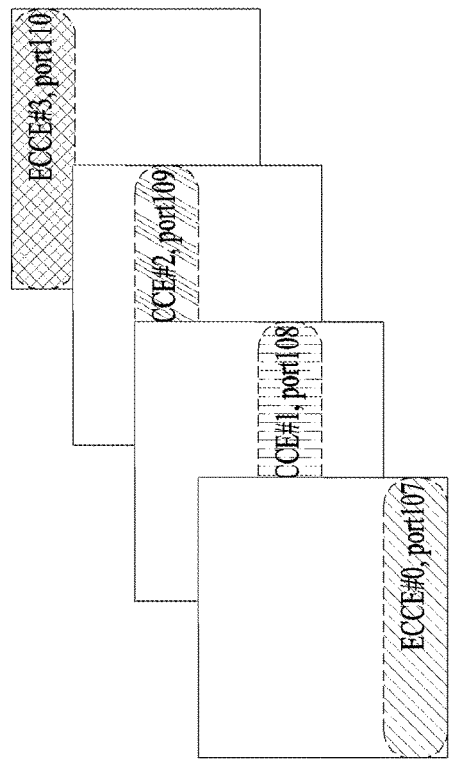
(a) EPDCCH to AP mapping

METHOD AND APPARATUS FOR RECEIVING DOWNLINK SIGNALS IN WIRELESS COMMUNICATION SYSTEM

CROSS REFERENCE TO RELATED APPLICATIONS

This application is the National Phase of PCT International Application No. PCT/KR2013/011051, filed on Dec. 2, 2013, which claims priority under 35 U.S.C. 119(e) to U.S. Provisional Application No. 61/737,110, filed on Dec. 14, 2012, all of which are hereby expressly incorporated by reference into the present application.

TECHNICAL FIELD

The following description relates to a wireless communication system and, more particularly, to a method and apparatus for receiving downlink signals via an enhanced physical downlink channel (EPDCCH).

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system a Multi Carrier Frequency Division Multiple Access (MC-FDMA) system and the like.

DISCLOSURE

Technical Problem

An object of the present invention devised to solve the problem lies in handling of interference caused due to a neighbor cell signal transmitted via the same resources when a user equipment (UE) receives control signals via an EPDCCH.

The technical problems solved by the present invention are not limited to the above technical problems and other technical problems which are not described herein will become apparent to those skilled in the art from the following description.

Technical Solution

The object of the present invention can be achieved by providing a method of receiving a downlink signal at a user equipment (UE) in a wireless communication system including receiving information related to an interference signal from a serving cell and performing interference cancellation in physical resource block (PRB) pairs used to transmit the downlink signal based on the information related to the interference signal, wherein the information related to the interference signal includes use of each of the PRB pairs in a neighbor cell of the serving cell and an enhanced physical downlink channel (EPDCCH) transmission type if each PRB pair is used for an EPDCCH.

In another aspect of the present invention, provided herein is a user equipment (UE) apparatus in a wireless communication system including a reception module and a processor, wherein the processor receives information related to an interference signal from a serving cell and performs interference cancellation in physical resource block (PRB) pairs used to transmit a downlink signal based on the information related to the interference signal, wherein the information related to the interference signal includes use of each of the PRB pairs in a neighbor cell of the serving cell and an enhanced physical downlink channel (EPDCCH) transmission type if each PRB pair is used for an EPDCCH.

The embodiments of the present invention may include the following features.

The downlink signal may be one of an EPDCCH or a physical downlink shared channel (PDSCH).

The information related to the interference signal may further include whether interference in each PRB pair is homogeneous.

If each PRB pair is used for the EPDCCH, the EPDCCH transmission type is a localized transmission type and interference is not homogeneous, the UE may perform energy detection in enhanced control channel element (ECCE) units, for interference cancellation.

The UE may perform interference cancellation only with respect to an EPDCCH of the neighbor cell corresponding to an EPDCCH via which control information is transmitted.

If each PRB pair is used for the EPDCCH, the EPDCCH transmission type is a localized transmission type and interference is homogeneous, the UE may perform interference cancellation regardless of an aggregation level and antenna port of an EPDCCH via which control information is transmitted.

If each PRB pair is used for the PDSCH, the UE may perform interference cancellation regardless of an aggregation level and antenna port of an EPDCCH via which control information is transmitted.

The information related to the interference signal may further include port information used to transmit an EPDCCH by the neighbor cell in each PRB pair.

The information related to the interference signal may further include information related to the amount of resource elements used to transmit an EPDCCH by the neighbor cell.

The information related to the amount of resource elements may include a cyclic shift type, a subframe type, a channel state information-reference signal (CSI-RS) configuration and the number of PDCCH symbols.

The information related to the interference signal may further include a scrambling sequence parameter used by the neighbor cell.

The scrambling sequence parameter may include one or more of a cell ID, a UE ID, an nSCID and an X parameter.

The information related to the interference signal may be determined according to capability information of the UE and the capability information may include the number of types of interference to be cancelled by the UE in one PRB pair.

Advantageous Effects

According to the present invention, it is possible to efficiently cancel an interference signal of a neighbor cell transmitted via the same resource region when a UE receives an EPDCCH so as to improve reception performance.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 6 is a diagram illustrating a reference signal.

FIG. 7 is a diagram illustrating a demodulation reference signal.

FIG. 9 is a diagram illustrating an EPDCCH and an antenna port.

BEST MODE

Figure 1:
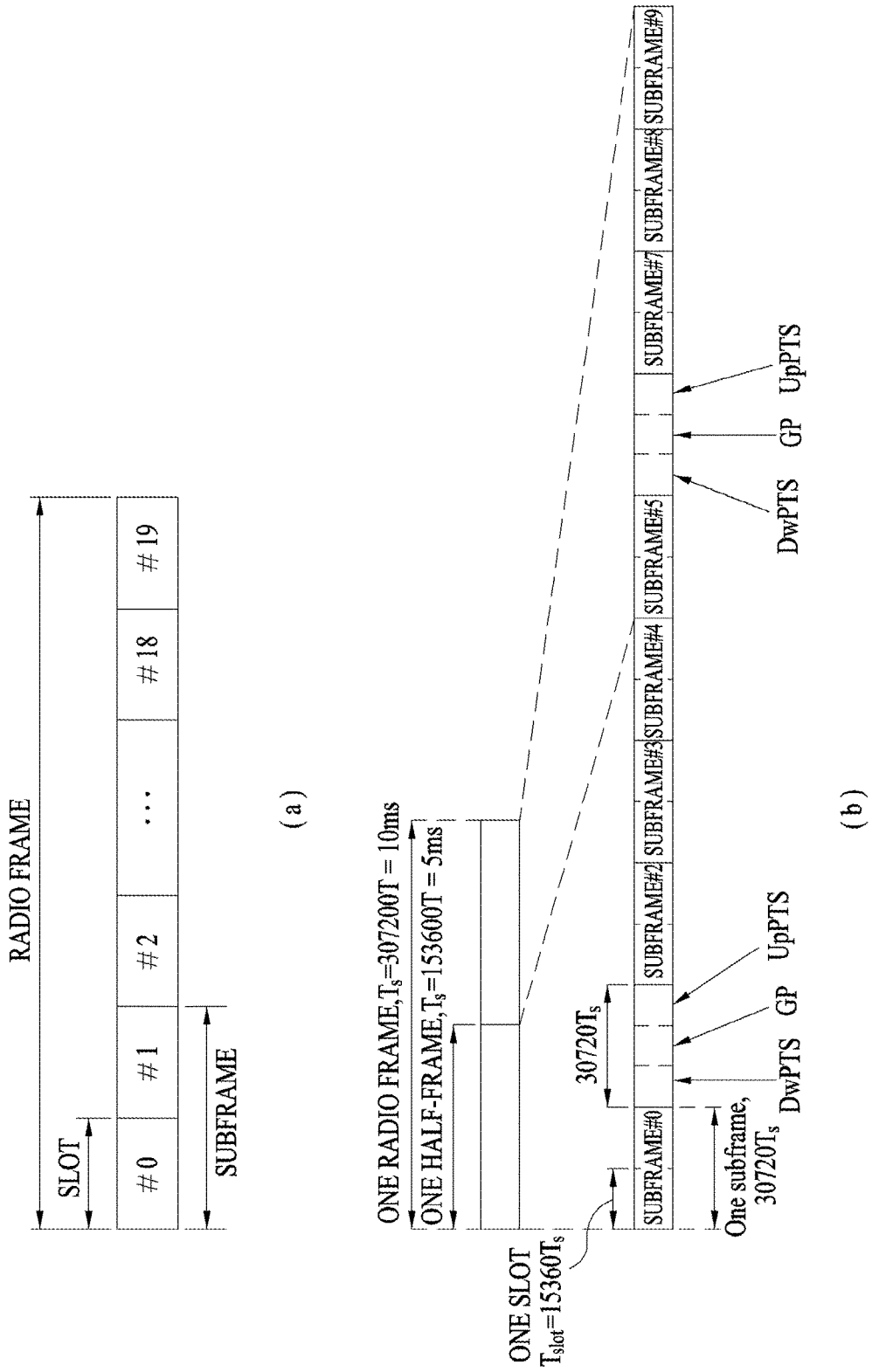
FIG. 1 is a diagram showing the structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
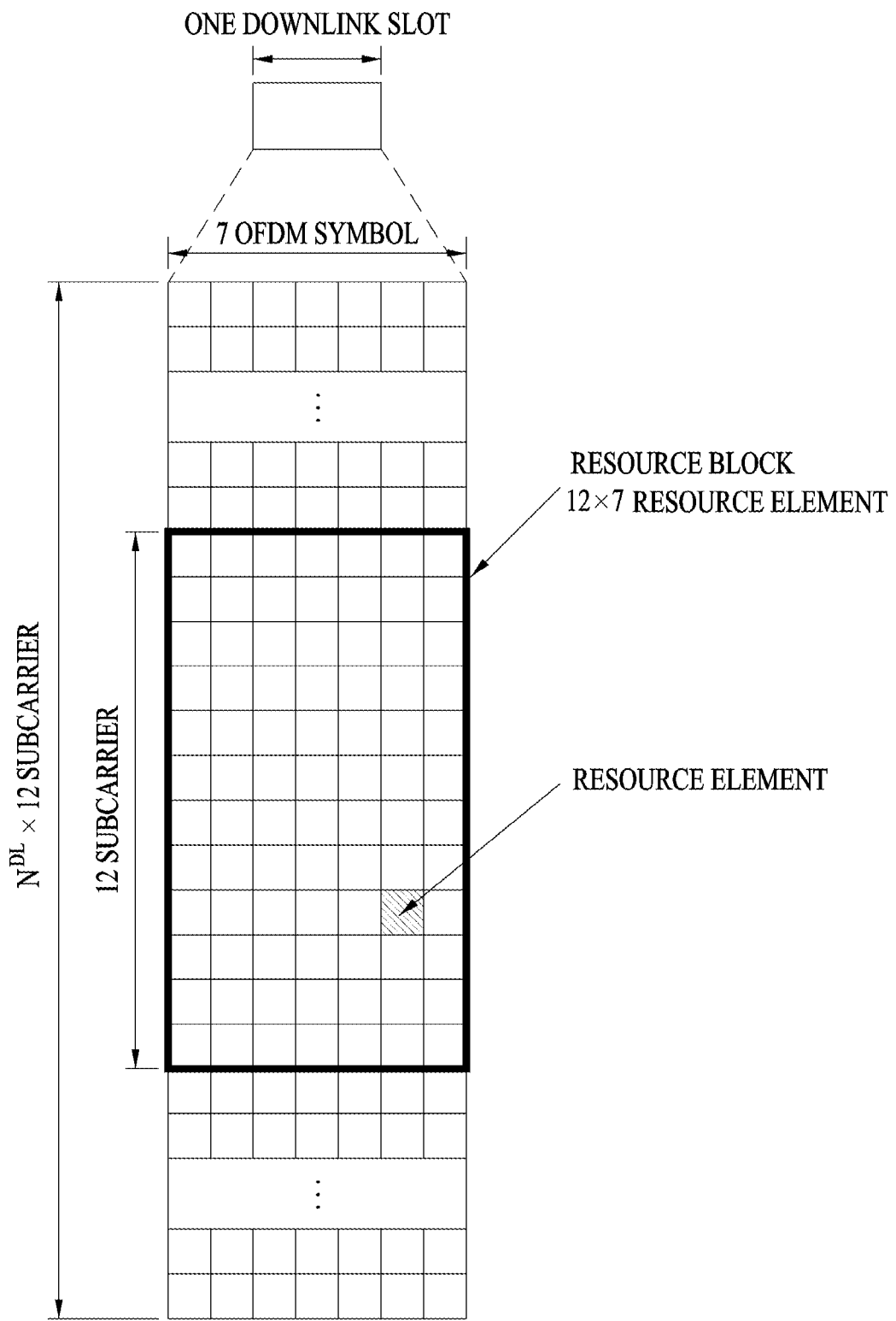
FIG. 2 is a diagram illustrating a resource grid in a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
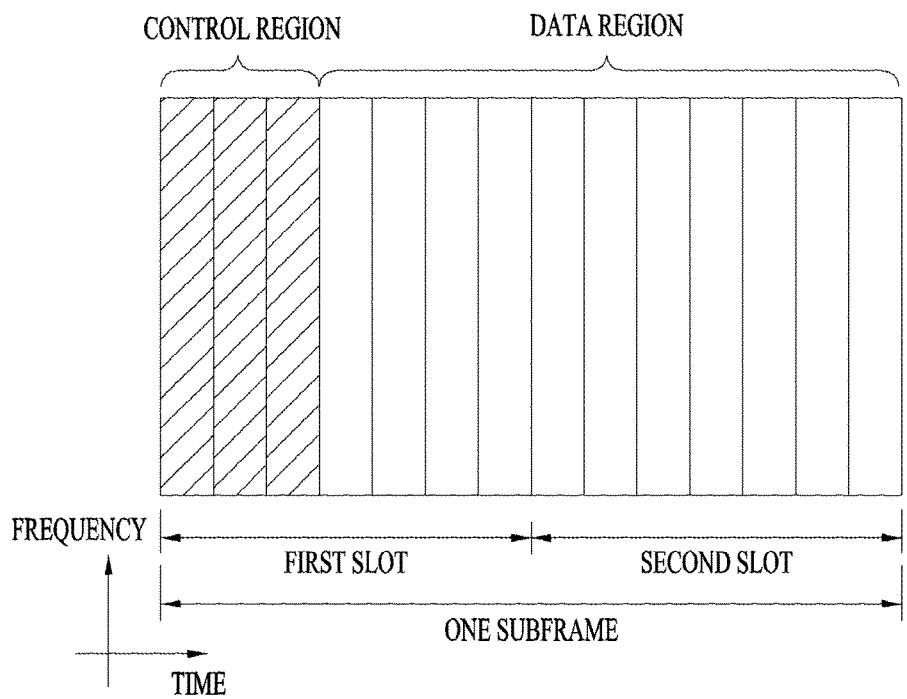
FIG. 3 is a diagram showing the structure of a downlink subframe.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission.

Control information carried on the PDCCH is called downlink control information (DCI). The DCI includes UL or DL scheduling information or UL transmit power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control information, and voice over Internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
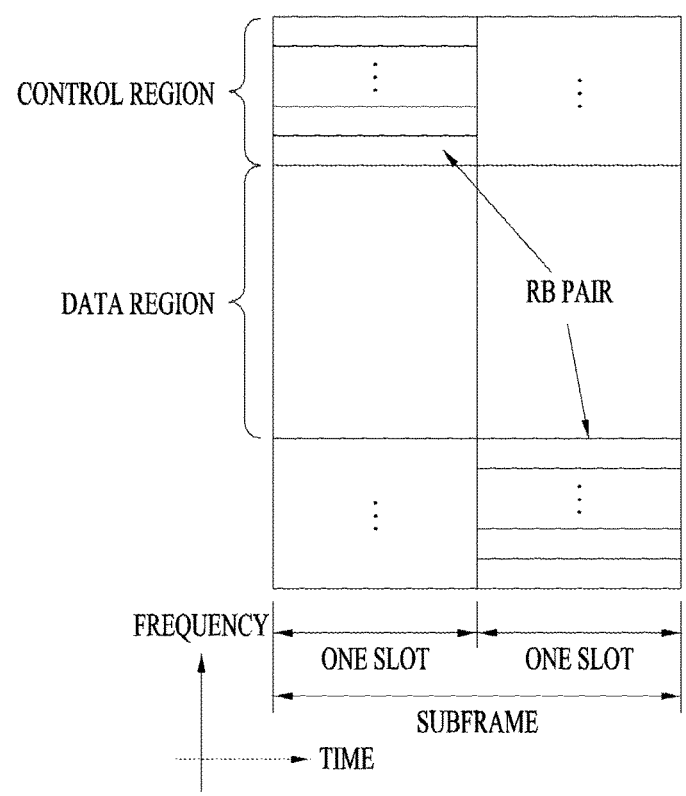
FIG. 4 is a diagram showing the structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

DCI Format

DCI formats 0, 1, 1A, 1B, 1C, 1D, 2, 2A, 2B, 2C, 3, 3A and 4 are defined in LTE-A (Release 10). DCI formats 0, 1A, 3 and 3A are defined to have the same message size to reduce the number of times of blind decoding, which will be described later. The DCI formats may be divided into i) DCI formats 0 and 4 used for uplink grant, ii) DCI formats 1, 1A, 1B, 1C, 1D, 2, 2A, 2B and 2C used for downlink scheduling allocation, and iii) DCI formats 3 and 3A for power control commands according to purposes of use of control information to be transmitted.

DCI format 0 used for uplink grant may include a carrier indicator necessary for carrier aggregation, which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission in relation to a HARQ process, a transmit power control (TPC) command for a scheduled PUSCH, information about a cyclic shift for a demodulation reference signal (DMRS) and OCC index, and a UL index and channel quality indicator request (CSI request) necessary for a TDD operation, etc. DCI format 0 does not include a redundancy version, unlike DCI formats relating to downlink scheduling allocation since DCI format 0 uses synchronous HARQ. The carrier indicator is not included in DCI formats when cross-carrier scheduling is not used.

DCI format 4, which is newly added to DCI formats in LTE-A Release 10, supports application of spatial multiplexing to uplink transmission in LTE-A. DCI format 4 has a larger message size DCI format 0 because it further includes information for spatial multiplexing. DCI format 4 includes additional control information in addition to control information included in DCI format 0. That is, DCI format 4 includes information on a modulation and coding scheme for the second transmission block, precoding information for multi-antenna transmission, and sounding reference signal (SRS) request information. DCI format 4 does not include an offset for differentiation between formats 0 and 1A because it has a larger size than DCI format 0.

DCI formats 1, 1A, 1B, 1C, 1D, 2, 2A, 2B and 2C for downlink scheduling allocation may be broadly divided into DCI formats 1, 1A, 1B, 1C and 1D, which do not support spatial multiplexing, and DCI formats 2, 2A, 2B and 2C, which support spatial multiplexing.

DCI format 1C supports only frequency contiguous allocation as compact frequency allocation and does not include the carrier indicator and redundancy version, compared to the other formats.

DCI format 1A is for downlink scheduling and random access. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission in relation to a HARQ process, a TPC command for a PUCCH, an uplink index necessary for a TDD operation, etc.

DCI format 1 includes control information similar to that of DCI format 1A. DCI format 1 supports non-contiguous resource allocation, while DCI format 1A is related to contiguous resource allocation. Accordingly, DCI format 1 further includes a resource allocation header, and thus slightly increases control signaling overhead as a trade-off for an increase in flexibility of resource allocation.

Both DCI formats 1B and 1D further include precoding information, compared to DCI format 1. DCI format 1B includes PMI acknowledgement and DCI format 1D includes downlink power offset information. Most control information included in DCI formats 1B and 1D corresponds to that of DCI format 1A.

DCI formats 2, 2A, 2B and 2C basically include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing, and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C, which may be regarded as an extended version of DCI format 2B, supports spatial multiplexing for up to 8 layers.

DCI formats 3 and 3A may be used to complement the TPC information included in the aforementioned DCI formats for uplink grant and downlink scheduling allocation, namely, to support semi-persistent scheduling. A 1-bit command is used per UE in the case of DCI format 3, while a 2-bit command is used per UE in the case of DCI format 3A.

One of the DCI formats described above is transmitted through a PDCCH, and a plurality of PDCCHs may be transmitted in a control region. A UE may monitor the plurality of PDCCHs.

PDCCH Processing

Control channel elements (CCEs), contiguous logical allocation units, are used to map a PDCCH to REs for efficient processing. A CCE includes a plurality of resource element groups (e.g., 9 REGs). Each REG includes four neighboring REs other than an RS.

The number of CCEs necessary for a specific PDCCH depends on a DCI payload corresponding to a control information size, a cell bandwidth, a channel coding rate, etc. Specifically, the number of CCEs for a specific PDCCH may be defined according to PDCCH formats as shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As described above, one of the four formats may be used for a PDCCH and is not known to the UE. Accordingly, the UE performs decoding without knowing the PDCCH format. This is called blind decoding. Since operation overhead is generated if a UE decodes all the CCEs usable for downlink for each PDCCH, a search space is defined in consideration of restriction on a scheduler and the number of decoding attempts.

That is, the search space is a set of candidate PDCCHs composed of CCEs on which a UE needs to attempt to perform decoding at an aggregation level. Each aggregation level and the corresponding number of candidate PDCCHs may be defined as shown in Table 2.

TABLE 2

| | Search space | | Number of PDCCH |
|---|---|---|---|
| | Aggregation level | Size (CCE unit) | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown Table 2, the UE has a plurality of search spaces at each aggregation level because 4 aggregation levels are present. The search spaces may be divided into a UE-specific search space and a common search space, as shown in Table 2. The UE-specific search space is for specific UEs. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space (CSS) is used for a case in which a plurality of UEs or all UEs need to receive PDCCHs, for system information dynamic scheduling or paging messages, for example. The CSS may be used for a specific UE for resource management. Furthermore, the CSS may overlap the UE-specific search space. The control information for the UEs may be masked by one of RA-RNTI, SI-RNTI and P-RNTI.

Specifically, the search space may be determined by Equation 1 given below.

$$L\{(Y_k+m') \mod \lfloor N_{CCE,k}/L \rfloor\}+i \qquad \text{Equation 1}$$

Here, L denotes an aggregation level, $Y_k$ is a variable determined by an RNTI and subframe number k, and m' is the number of PDCCH candidates. If carrier aggregation is applied, $m'=m+M^{(L)} \cdot n_{CI}$ and otherwise, $m'=m$. Herein, $M^{(L)}$ is the number of PDCCH candidates. $N_{CCE,k}$ is the total number of CCEs in the control region of a k-th subframe, and i is a factor indicating an individual CCE in each PDCCH candidate and is set as i=0, 1, . . . , L−1. For the CSS, $Y_k$ is always determined to be 0.

Figure 5:
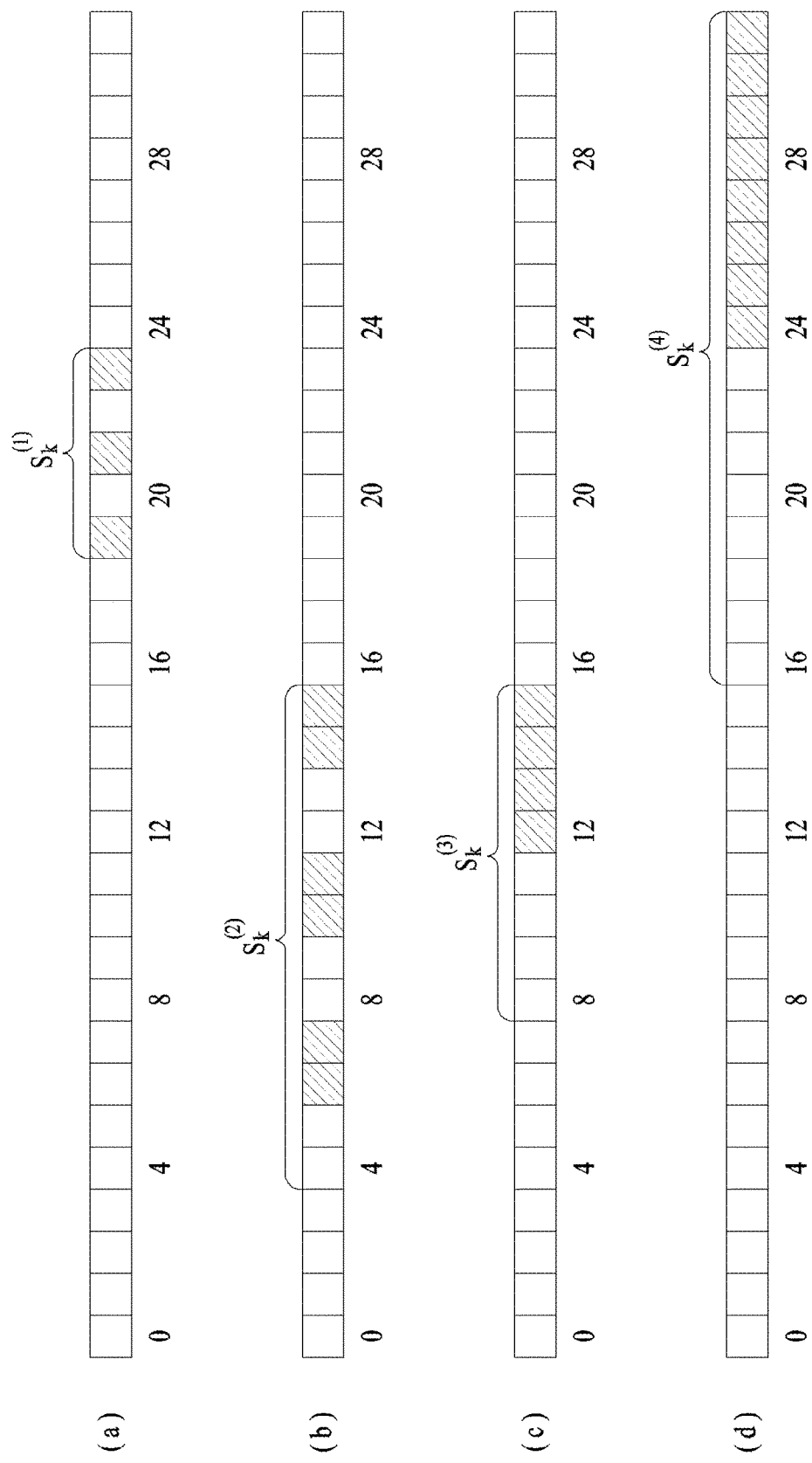
FIG. 5 is a diagram illustrating a search space.

FIG. 5 shows USSs (shaded portions) at respective aggregation levels which may be defined according to Equation 1. Carrier aggregation is not used, and $N_{CCE,k}$ is set to 32 for simplicity of illustration.

FIGS. 5(a), 5(b), 5(c) and 5(d) illustrate the cases of aggregation levels 1, 2, 4 and 8, respectively. The numbers represent CCE numbers. In FIG. 5, the start CCE of a search space at each aggregation level is determined based on an RNTI and subframe number k. This CCE may be differently determined among the aggregations levels in the same subframe for a UE due to the modulo function and L. The CCE is always determined to correspond to a multiple of the aggregation level due to L. In the description given below, $Y_k$ is assumed to be CCE 18. The UE attempts to sequentially perform decoding from the start CCE in units of CCEs determined for a corresponding aggregation level. In FIG. 5(b), for example, the UE attempts to perform decoding from CCE 4, the start CCE, for every two CCEs according to the aggregation levels.

In this manner, the UE attempts to perform decoding for a search space. The number of decoding attempts is determined by a DCI format and a transmission mode determined through radio resource control (RRC) signaling. If carrier aggregation is not applied, the UE needs to attempt to perform decoding up to 12 times in a CSS, in consideration of two DCI sizes (DCI formats 0/1A/3/3A and DCI format 1C) for each of six PDCCH candidates. In a USS, the UE needs to attempt to perform decoding up to 32 times, in consideration of two DCI sizes for each of 16 PDCCH candidates (6+6+2+2=16). Accordingly, when carrier aggregation is not applied, the UE needs to attempt to perform decoding up to 44 times.

On the other hand, if carrier aggregation is applied, the maximum number of decodings increases because as many decodings for a USS and DCI format 4 as the number of DL resources (DL component carriers) are added.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into a UL RS and a DL RS. In the current LTE system, the UL RSs include:

i) a demodulation-reference signal (DM-RS) for channel estimation for coherent demodulation of information transmitted over a PUSCH and a PUCCH, and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 6 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 6(a)) and a length of 12 OFDM symbols for an extended CP (FIG. 6(b)).

FIG. 6 shows locations of RSs on RB pairs in a system in which the BS supports four transmit antennas. In FIG. 6, resource elements (REs) denoted by "0", "1", "2" and "3" represent the locations of the CRSs for antenna port indexes 0, 1, 2 and 3, respectively. In FIG. 6, REs denoted by "D" represent locations of the DMRSs.

Demodulation Reference Signal (DMRS)

A DMRS is used when a UE performs channel estimation for a PDSCH. The DMRS may be used in transmission modes 7, 8 and 9. The DMRS was initially defined for single-layer transmission of antenna port #5 and then has been extended for spatial multiplexing of a maximum of 8 layers. The DMRS, which is also referred to as a UE-specific reference signal, is only transmitted for one specific UE. Accordingly, the DMRS may be transmitted only on an RB, on which a PDSCH for the specific UE is transmitted.

Generation of a DMRS for a maximum of 8 layers will now be described. The DMRS may be transmitted in a state in which a reference signal sequence r(m) generated according to Equation 1 is mapped to complex-valued modulation symbols $a_{k,l}^{(p)}$ according to Equation 2. FIG. 7 shows antenna ports 7 to 10, in which the DMRS is mapped to a resource grid on a subframe in the normal CP case according to Equation 2.

$$r(m) = \frac{1}{\sqrt{2}}(1 - 2 \cdot c(2m)) + j\frac{1}{\sqrt{2}}(1 - 2 \cdot c(2m+1)), \quad \text{Equation 2}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

where, r(m) denotes a reference signal sequence, c(i) denotes a random pseudo sequence, and $N_{RB}^{max,DL}$ denotes a maximum number of RBs of a downlink bandwidth.

$$a_{k,l}^{(p)} = w_p(l') \cdot r(3 \cdot l' \cdot N_{RB}^{max,DL} + 3 \cdot n_{PRB} + m') \quad \text{Equation 3}$$

$$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\bmod 2 + 2 & \text{if in a special subframe with configuration 3, 4, 8 or 9} \\ l'\bmod 2 + 2 + 3\lfloor l'/2 \rfloor & \text{if in a special subframe with configuration 1, 2, 6, or 7} \\ l'\bmod 2 + 5 & \text{if not in a special subframe} \end{cases}$$

$$l' = \begin{cases} 0, 1, 2, 3 & \text{if } n_s\bmod 2 = 0 \text{ and in a special subframe with configuration 1, 2, 6, or 7} \\ 0, 1 & \text{if } n_s\bmod 2 = 0 \text{ and not in special subframe with configuration 1, 2, 6, or 7} \\ 2, 3 & \text{if } n_s\bmod 2 = 1 \text{ and not in special subframe with configuration 1, 2, 6, or 7} \end{cases}$$

$$m' = 0, 1, 2$$

As can be seen from Equation 3, when the reference signal sequence is mapped to the complex-valued modulation symbols, an orthogonal sequence $\overline{w}_p(i)$ shown in Table 3 is applied according to antenna port.

TABLE 3

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The DMRS may be used to perform channel estimation using different methods according to spreading factor 2 or 4. Referring to Table 3, in antenna ports 7 to 10, since the orthogonal sequence is repeated in the form of [a b a b], the spreading factor is 2. In antenna ports 11 to 14, the spreading factor is 4. If the spreading factor is 2, the UE may despread a DMRS of a first slot and a DMRS of a second slot using the spreading factor of 2 and then perform channel estimation via time interpolation. If the spreading factor is 4, the DMRS may be despread in the entire subframe using the spreading factor of 4 to perform channel estimation.

Channel estimation using the above-described spreading factor is advantageous in that, when the spreading factor is 2, gain can be obtained by applying time interpolation with high mobility and gain may be obtained in decoding time by performing despreading using the DMRS of the first slot and, when the spreading factor is 4, a larger number of UEs or ranks may be supported.

Figure 8:
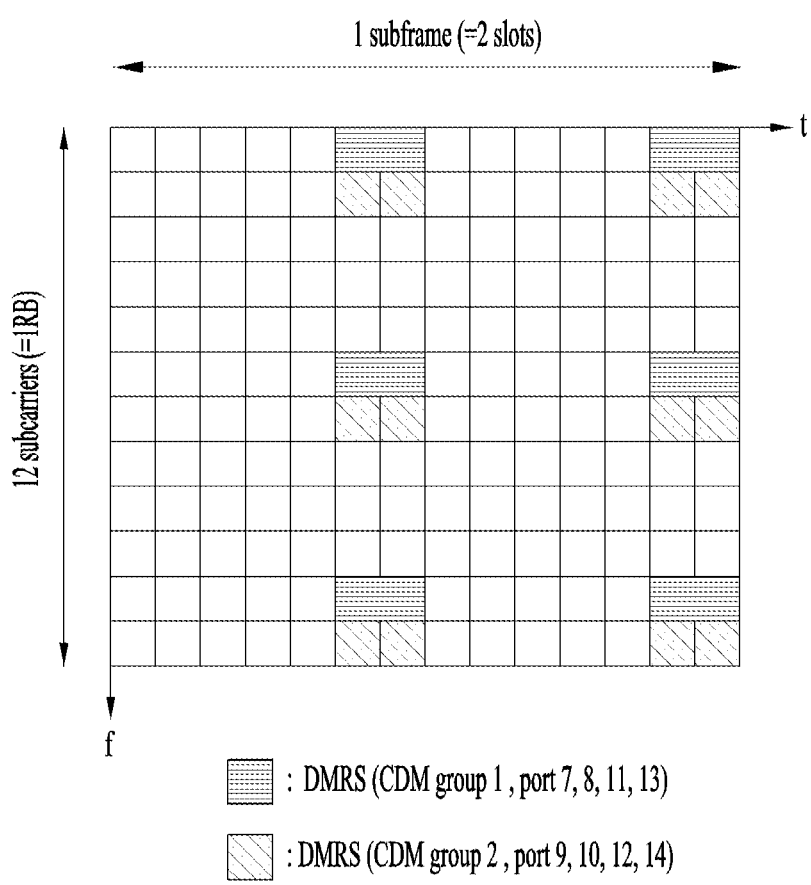
FIG. 8 is a diagram illustrating a code divisional multiplexing (CDM) group.

DMRS overhead will be described with reference to FIG. 8. FIG. 8 shows mapping of DMRSs to antenna ports 7 to 14 on a subframe. As shown in FIG. 8, the DMRSs may be divided into code divisional multiplexing (CDM) group 1 (or first antenna port set) and CMD group 2 (or second antenna port set) according to the location where the DMRS is mapped to the resource grid. The DMRSs are transmitted via antenna ports 7, 8, 11 and 13 in REs corresponding to CDM group 1 and the DMRSs are transmitted via antenna ports 9, 10, 12 and 14 in REs corresponding to CDM group 2. That is, in the antenna ports included in one CDM group, the REs, on which the DMRS is transmitted, are the same. If the DMRSs are transmitted only using the antenna ports corresponding to CDM group 1, resources necessary for the DMRSs are 12 REs, that is, DMRS overhead is 12. Similarly, if the antenna ports corresponding to CDM group 2 are used, DMRS overhead is 24.

Coordinated Multi-point (CoMP)

According to improved system performance requirements of a 3GPP LTE-A system, CoMP transmission/reception technology (co-MIMO, collaborative MIMO or network MIMO) is proposed. CoMP technology may increase performance of a UE located at a cell edge and increase average sector throughput.

In general, in a multi-cell environment in which a frequency reuse factor is 1, performance and average sector throughput of a UE located at a cell edge may be reduced due to inter-cell interference (ICI). In order to reduce ICI, in a legacy LTE system, a method of enabling a UE located at a cell edge to have appropriate throughput and performance in an environment restricted by interference using a simple passive method such as fractional frequency reuse (FFR) via specific power control was applied. However, ICI is reduced or reused by a UE as a desired signal more preferably than reduction of frequency resources used per cell. In order to accomplish the above-described object, a CoMP transmission scheme is applicable.

The CoMP scheme applicable to downlink may be largely divided into a joint processing (JP) scheme and a coordinated scheduling/beamforming (CS/CB) scheme.

In the JP scheme, each point (BS) of a CoMP unit may use data. The CoMP unit refers to a set of BSs used in the CoMP scheme. The JP scheme may be classified into a joint transmission scheme and a dynamic cell selection scheme.

The joint transmission scheme refers to a scheme for simultaneously transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively cancel interference with another UE.

The dynamic cell selection scheme refers to a scheme for transmitting a PDSCH from one point (of the CoMP unit). That is, data transmitted to a single UE at a specific time is transmitted from one point and the other points in the coordinated unit do not transmit data to the UE at that time. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination among a plurality of geographically separated points. CoMP schemes applicable to uplink may be classified into Joint Reception (JR) and Coordinated Scheduling/Beamforming (CS/CB).

JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

If such a CoMP system is used, the UE may commonly receive data from a multi-cell base station. In addition, each base station may simultaneously support one or more UEs using the same radio frequency resources to improve system performance. In addition, the base station may perform space division multiple access (SDMA) based on channel state information between the base station and the UE.

In a CoMP system, a serving base station and one or more cooperative base stations are connected to a scheduler via a backbone network. The scheduler may operate by receiving information about a channel state between each UE and each cooperative base station measured by each base station via the backbone network. For example, the scheduler may schedule information about coordinated MIMO operation with respect to a serving base station and one or more cooperative base stations. That is, the scheduler may directly send an instruction for coordinated MIMO operation to each base station.

As described above, the CoMP system indicates that a plurality of cells is grouped into one group to operate as a virtual MIMO system and a communication scheme of a MIMO system using multiple antennas is applicable.

Enhanced-PDCCH (EPDCCH)

In an LTE system of LTE Release 11 or later, as a solution for PDCCH capacity shortage due to CoMP, multi-user-multiple input multiple output (MU-MIMO) and PDCCH performance reduction due to inter-cell interference, an enhanced-PDCCH (EPDCCH) which may be transmitted via a conventional PDSCH region is considered. In the EPDCCH, in order to obtain precoding gain, unlike to an existing CRS based PDCCH, channel estimation may be performed based on a DMRS. Such a DMRS may be referred to as a DMRS associated with an EPDCCH, in order to be distinguished from a DMRS associated with a PDSCH which is a DMRS used for channel estimation for PDSCH decoding.

A UE may perform blind decoding similarly to an existing LTE/LTE-A system, in order to receive/acquire control information (DCI) via an EPDCCH. More specifically, the UE may attempt (monitor) decoding of a set of EPDCCH candidates per aggregation level, for DCI formats corresponding to a set transmission mode. Here, the set of EPDCCH candidates to be monitored may be referred to as an EPDCCH UE-specific search space and this search space may be set/configured per aggregation level. In addition, differently from the above-described existing LTE/LTE-A system, {1, 2, 4, 8, 16, 32} is possible as the aggregation level according to subframe type, CP length, the amount of available resources in a PRB pair, etc.

A UE in which an EPDCCH is configured indexes REs included in a PRB pair set in EREG units and indexes the EREGs in ECCE units. The UE may determine EPDCCH candidates configuring a search space based on the indexed ECCEs to perform blind decoding, thereby receiving control information. Here, the EREG corresponds to an REG of the existing LTE/LTE-A system and the ECCE corresponds to a CCE. One PRB pair may include 16 EREGs.

EPDCCH transmission may be divided into localized EPDCCH transmission and distributed EPDCCH transmission according to the configuration of a PRB pair used for EPDCCH transmission. Localized EPDCCH transmission means the case in which enhanced control channel elements (ECCEs) used to transmit one piece of DCI are contiguous in the frequency domain and specific precoding is applicable in order to obtain beamforming gain. For example, localized EPDCCH transmission may be based on consecutive ECCEs corresponding in number to an aggregation level. In contrast, distributed EPDCCH transmission means that one EPDCCH is transmitted on a PRB pair separated in the frequency domain and has frequency diversity gain. For example, distributed EPDCCH transmission may be based on an ECCE including four (in the extended CP case, eight) enhanced resource element groups (EREGs) (special subframe with configuration of 1, 2, 6, 7 or 9) included in each PRB pair separated in the frequency domain.

In localized EPDCCH transmission, antenna ports used for EPDCCH transmission may be determined according to the position of resources used for the EPDCCH (or DCI). If four ECCEs are included in one PRB pair, REs belonging to each ECCE may be transmitted on any one of antenna ports 107, 108, 109 and 110. FIG. 9 shows EPDCCH-to-antenna port mapping. That is, the localized EPDCCH is mapped to one antenna port per ECCE in one PRB pair. Although ECCEs are shown in a frequency division multiplexing method in FIG. 9(a), REs configuring each ECCE are uniformly distributed in the PRB pair and REs belonging to different ECCEs are mapped to different frequency and time resources. FIG. 9(a) shows aggregation level 1 in which the antenna port and resource used by one ECCE may not be used by another ECCE. If an aggregation level is greater than 1, an EPDCCH uses one antenna port and occupies two or more ECCEs and thus another EPDCCH may use the same resources using different antenna ports for multi-user-multiple input multiple output (MU-MIMO). That is, the EPDCCH may be distinguished by the antenna port and resource in aggregation level 1 and by the antenna port in aggregation level 2 or higher. As shown in FIG. 9(*b*), a PDSCH may be distinguished by the antenna port. In distributed EPDCCH transmission, two antenna ports 107 and 109 are used and the RE and the antenna port are in one-to-one correspondence.

A set of PRB pairs (EPDCCH PRB set) which may be used for any one of localized EPDCCH transmission or distributed EPDCCH transmission may be set with respect to one or two or more UEs and one EPDCCH PRB set may include N (one of 1, 2, 4, 8 and 16) PRB pairs. Each EPDCCH PRB set may have different N values and each EPDCCH PRB set may have overlapping PRB pairs. The EPDCCH PRB set and the number N of PRB pairs configuring each EPDCCH PRB set may be signaled to the UE.

Advanced Receiver and EPDCCH Interference Situation

A UE may include a receiver including interference cancellation capability (e.g., an interference rejection combining (IRC) receiver, etc., although the present invention is not limited thereto). An advanced receiver such as an IRC receiver may generate receive beams capable of reducing influence of interference (this means that interference is actively cancelled and includes a method of generating a signal equal/similar to an interference signal and subtracting the signal from the received signal or applying a weight to a signal of a specific beam/direction upon reception) and receive a signal, in order to reduce interference from neighbor cells, inter-layer interference due to MU-MIMO, etc. In some cases, interference cancellation of the advanced receiver may reduce reception performance in the EPDCCH. This will be described with reference to FIG. 10.

Figure 10:
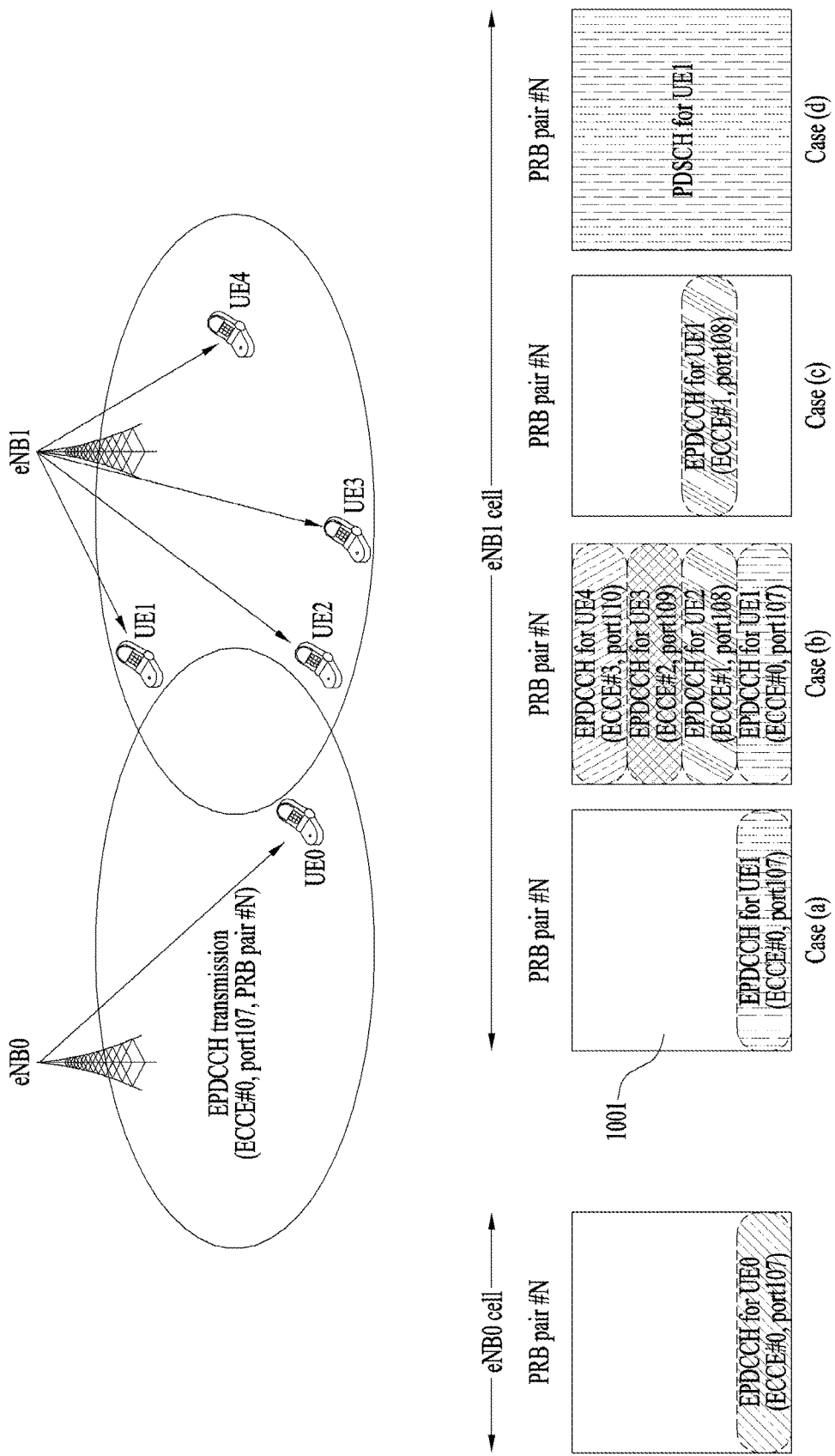
FIGS. 10 to 12 are diagrams illustrating an embodiment of the present invention.

FIG. 10 shows various interference situations, in which, when a UE UE0 receives control information from a serving cell eNB0 via an EPDDCH, a neighbor cell eNB1 of the serving cell eNB0 transmits a downlink signal in the same PRB pair. In FIG. 10, assume that the UE UE0 receives control information via an EPDCCH (ECCE index 0 and antenna port 107 are used) of aggregation level 1 in PRB pair #N. Interference caused in the UE UE0 may be changed according to a signal (EPDCCH or PDSCH) transmitted from the neighbor cell eNB1 to UEs (at least one or more of UE1 to UE4) belonging to the neighbor cell.

For example, if the neighbor cell eNB1 transmits control information via the EPDCCH (ECCE index 0 and antenna port 107 are used) of aggregation level 1 as in case (a), the UE UE0 operates the advanced receiver with respect to the EPDCCH of aggregation level 1 (that is, performs interference cancellation). If interference cancellation is performed in PRB pair #N without considering EPDCCH transmission (information about the aggregation level and antenna port of the EPDCCH received by UE0 and the aggregation level and antenna port of the EPDCCH received by UE1), the interference signal is subtracted even in the resource region 1001, in which interference is not caused, thereby reducing receive power and reception performance. Even in Case (b), since the EPDCCH transmitted via antenna port 107 and ECCE index #0 actually causes interference, interference cancellation of the other EPDCCHs may reduce the receive power of the EPDCCH or cause performance reduction due to non-optimum filtering. Here, reduction of receive power may occur by subtracting the signal of the neighbor cell for each antenna port from the total receive power and the non-optimum filtering may occur by subtracting all the signals for the UE2 to UE4 other than the signal actually influencing the UE UE0 to perform incomplete interference cancellation. In addition, in case (c), since the EPDCCH transmitted via ECCE index #1 and antenna port 108 does not causes interference in EPDCCH reception of the UE UE0, when interference cancellation is not performed on the assumption that there is no dominant interference, better performance may be obtained. In case (d), since the PDSCH is transmitted via the entire PRB pair, interference cancellation is performed without considering the aggregation level and antenna port of the EPDCCH transmitted to the UE UE0.

As described above, due to the transmission method/properties of the EPDCCH, when the UE operates the advanced receiver (that is, performs interference cancellation), the aggregation level and antenna port of the EPDCCH received by the UE and the signal received by the neighbor cell (in case of the EPDCCH, the aggregation level and antenna port) needs to be considered. Hereinafter, signaling (information related to interference cancellation) necessary for a UE to appropriately perform interference cancellation and operation of a UE in each interference situation will be described in detail.

Embodiment

A serving cell may transmit, to a UE (or a UE group) for receiving a downlink signal (a downlink signal transmitted via an EPDCCH, a PDSCH or another channel), information related to interference cancellation including use of a predetermined resource unit in a neighbor cell (e.g., a PRB pair is used for PDSCH transmission or EPDCCH transmission in the neighbor cell) according to the predetermined resource unit (e.g., a PRB pair of an EPDCCH PRB set if a downlink signal is an EPDCCH/PDSCH). In addition, if use of the predetermined resource unit in the neighbor cell is related to EPDCCH transmission, the information related to the interference cancellation may include an EPDCCH (transmission) type, that is, whether the PRB pair is for localized EPDCCH transmission or distributed EPDCCH transmission), or whether interference is homogeneous in each PRB pair (the interference property is the same in the predetermined resource unit). The information related to the interference signal may be sent to the UE via RRC signaling.

More specifically, the network may signal, to each UE, information indicating for which resources indicated to be used for the EPDCCH (or PDSCH) are used in a neighbor cell (a cell may cause interference with the UE). For example, the resources may be indicated to be used for the PDSCH or EPDCCH in the neighbor cell.

If the resources are used for the EPDCCH in the neighbor cell, information indicating whether the EPDCCH transmission type is a localized type or a distributed type may be included. This is because operation of the UE for processing interference may vary according to EPDCCH transmission type. For example, if the EPDCCH transmission type is a local type, processing related to interference cancellation may be performed in ECCE units and, if the EPDCCH transmission type is a distributed type, processing related to interference cancellation may be performed in EREG units.

The network may signal whether the interference property is the same (interference is homogeneous) in the predetermined resource unit (e.g., a specific EPDCCH set, a specific PRB pair (set), a specific ECCE (set), etc.). Here, the same interference property means that, if a predetermined resource unit is one PRB pair, a PDSCH is transmitted or only one piece of DCI is transmitted in one PRB pair (e.g., in case of aggregation level 4). If interference is homogeneous, the UE may perform interference cancellation regardless of the aggregation level and antenna port of the EPD- CCH received thereby. If interference is not homogeneous, the UE may perform blind detection (e.g., energy detection) of each reference signal RE and data RE, estimate an interference range, an antenna port, etc. and configure a reception filter. In other words, the UE may perform energy detection in ECCE units (if the EPDCCH transmission type is a localized type) or in EREG units (if the EPDCCH transmission type is a distributed type), for interference cancellation.

The UE, which has received the information related to interference cancellation, may perform interference cancellation in an EPDCCH PRB set based on this information. Detailed interference cancellation of the UE will be described with reference to FIGS. 10 to 12. Although the following description focuses upon demodulation of an EPDCCH by a UE, as described above, the same/similar principle is also applicable to the case in which a PDSCH or another downlink signal is received.

In FIG. 10, assume that the UE UE0 receives an EPDCCH of aggregation level 1 and antenna port 107 in PRB pair #N included in a localized EPDCCH PRB set. In case (a), the UE may confirm that PRB pair #N is used for EPDCCH transmission in the neighbor cell and interference is not homogeneous in PRB pair #N via the information related to interference cancellation, perform energy detection in ECCE units (in the case in which the information related to interference cancellation includes an EPDCCH transmission type the UE need to perform energy detection using the ECCE unit and the EREG unit when the EPDCCH transmission type is not included) to confirm that the EPDCCH is transmitted using aggregation level 1 and antenna port 107 in PRB pair #N of the neighbor cell similarly to the serving cell. Accordingly, the UE may perform interference cancellation only with respect to the EPDCCH of aggregation level 1 and antenna port 107. In case (b), the UE may confirm that PRB pair #N is used for EPDCCH transmission in the neighbor cell and interference is not homogeneous in PRB pair #N via the information related to interference cancellation. The UE may perform energy detection in ECCE units (if the information related to interference cancellation indicates that the EPDCCH transmission type is a localized type) and operate the advanced receiver only with respect to the EPDCCH of aggregation level 1 and antenna port 107 which causes interference with the EPDCCH transmitted by the serving cell thereof. In case (c), the UE confirms that the signal of the neighbor cell causing dominant interference with the EPDCCH to be received thereby is not present via the information related to interference cancellation and via energy detection of the ECCE unit and does not operate the advanced receiver. In case (d), the UE may confirm that PRB pair #N is used for PDSCH transmission via the information related to interference cancellation. In this case, the UE may perform interference cancellation regardless of which ECCE is used by the EPDCCH transmitted thereby.

Figure 11:
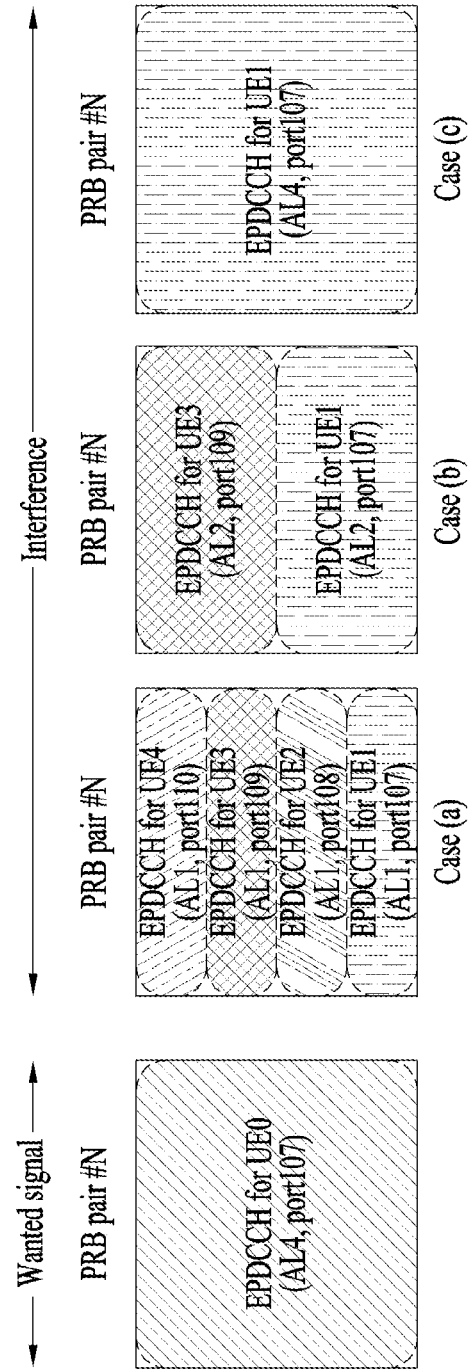

FIG. 11 shows the case in which an EPDCCH of aggregation level 4 (or more) is transmitted to the UE UE0 in PRB pair #N. (In the figure, it is assumed that an EPDCCH of aggregation level 4 is transmitted and this example is applicable to the case in which a PDSCH is transmitted in that PRB pair.) In case (a), the UE confirms that PRB pair #N is used for EPDCCH transmission in the neighbor cell, the interference property (in the PRB pair) is not homogeneous and localized transmission (only when the information is included) is performed and perform blind detection in ECCE units. Thereafter, as shown, the UE may individually perform interference cancellation only with respect to a region in which interference is caused by an ECCE per antenna port. Even in case (b), the UE may individually perform interference cancellation with respect to each EPDCCH of the neighbor cell which causes interference with the EPDCCH received thereby. In case (c), the UE may confirm that the interference property is homogenous and equally perform interference cancellation in PRB pair #N.

Figure 12:
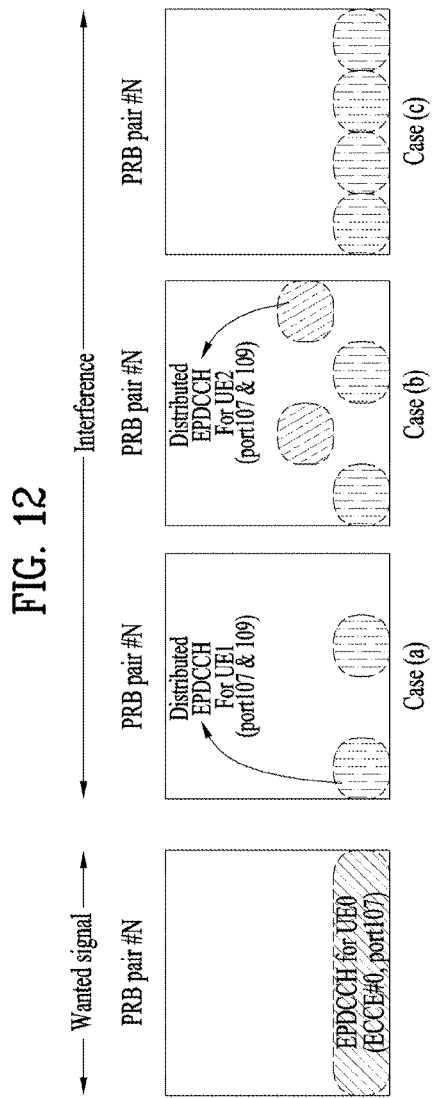

FIG. 12 shows the case in which a localized EPDCCH of aggregation level 1 and antenna port 107 is transmitted to the UE UE0 in PRB pair #N and the same PRB pair is used for distributed EPDCCH transmission in the neighbor cell. In cases (a), (b) and (c) of FIG. 12, a circle indicates an EREG. In distribution transmission, 16 EREGs are present in one PRB pair and a maximum of 16 pieces of independent DCI may be transmitted. However, since only two antenna ports 107 and 109 are used, there are two interference properties. Accordingly, when the information related to interference cancellation indicates that PRB pair #N is used for distributed EPDCCH transmission in the neighbor cell, the UE may determine whether 16 EREGs are activated (whether the EREGs are used for actual EPDCCH transmission) and perform interference cancellation with respect to the activated EREGs. For example, since only one EREG is activated in case (a), two types of interference are respectively activated in two EREGs and one type of interference is activated in four EREGs, the UE may perform interference cancellation with respect to the activated EREGs.

As described above, if the information related to interference cancellation further includes additional information, the burden of performing blind detection by the UE may be reduced. For example, in cases (a) and (c) of FIG. 10, if the information related to interference cancellation further includes antenna port information, the burden of performing blind detection per port may be significantly reduced. Hereinafter, information which may be included in the information related to interference cancellation will be described.

The information related to interference cancellation may include antenna port information/aggregation level used for the PRB pair.

The information related to interference cancellation may include information indicating whether MU-MIMO transmission is performed in localized EPDCCH transmission. If a localized EPDCCH is transmitted by the neighbor cell in MU-MIMO, all or some of DMRS sequence information (and/or port information) transmitted by the UE in MU-MIMO may be included.

The information related to the interference signal may further include information related to the amount of resource elements which may be used for EPDCCH transmission in the neighbor cell. The information related to the amount of resource elements may include a cyclic shift type, a subframe type, a channel state information-reference signal (CSI-RS) configuration, the number of PDCCH symbols, etc. The reason why such information is transmitted is because a specific antenna port, aggregation level, etc. may not be used according to the amount of resource elements which may be used for EPDCCH transmission and, in this case, the burden of performing blind detection by the UE may be reduced. For example, in the normal CP, in case of special a subframe configuration 1, 2, 6, 7 or 9, since only two ECCEs are present in one PRB pair, possible antenna ports are 107 and 109. In addition, even in the extended CP, in case of a normal subframe and a special subframe configuration 1, 2, 3, 5 or 6, only two ECCEs are present in one PRB pair and used antenna ports are 107 and 108. Accordingly, when the UE confirms the subframe configuration, CP information, etc., blind detection of the unused antenna ports may be omitted. In addition, if the number of REs which may be used for the EPDCCH is less than a predetermined number (e.g., 104) due to a signal such as a PDCCH, a CSI-RS, etc., aggregation level 1 is not used and thus the burden of performing blind detection by the UE may be reduced.

A scrambling parameter (a cell ID, a UE ID, an nSCID, an X parameter, etc.) may be included in the information related to the interference signal and transmitted.

Information about the resource region (time-frequency resource region) influenced by interference may be included in the information related to the interference signal. For example, a subframe set to which the information related to the interference signal is applied may be signaled and interference information may be signaled with respect to a plurality of subframe sets. Alternatively, in a frequency region, a region to which the information related to the interference signal is applied may be signaled in units of PRB pair, PRB pair set, occupied bandwidth, system bandwidth, etc.

In the above description, capabilities of the UE may be considered. More specifically, when the UE reports interference handling capabilities (e.g., how many interference properties may be handled in one resource unit), the network/eNB may configure information related to the interference signal based on the interference handling capabilities. (The number of dominant interference sources may vary according to UE.) For example, if the UE may cancel only one interference property in the PRB pair, the eNB may include only information about one dominant interference in the information related to the interference signal. Alternatively, if one UE may cancel only one interference property, the advanced receiver operates only when the interference property is homogeneous in the PRB pair (when the PDSCH is transmitted or when the EPDCCH of aggregation level 4 is transmitted) and, otherwise, a signal may be received via an MRC receiver.

In the above description, the neighbor cell (or dominant interference) per UE may be based on neighbor cell measurement of the UE. More specifically, the eNB may select a cell which causes or may cause dominant interference with the UE based on a neighbor cell measurement result reported by the UE and signal the information received from the selected cell to the UE. Here, the information may be delivered via an X2 interface and may include the type of the signal transmitted per resource (EPDCCH/PDSCH), an EPDCCH set and a transmission scheme/type (localized/distributed) used in each set, a possible UE ID per cell ID, an aggregation level, etc.

The information which may be included in the information related to the interference signal may be individual information and may be delivered to the UE via RRC signaling. For example, an individual information unit (e.g., an individual RRC message) may be composed of information about use of a PRB pair in a neighbor cell and an EPDCCH transmission type and may be transmitted from a network to a UE.

Although the above description focuses upon an embodiment in which the advanced receiver is used for EPDCCH demodulation, the present invention is applicable to demodulation of a physical channel including a PDSCH and a signal.

Apparatus Configuration of Embodiment of the Present Invention

Figure 13:
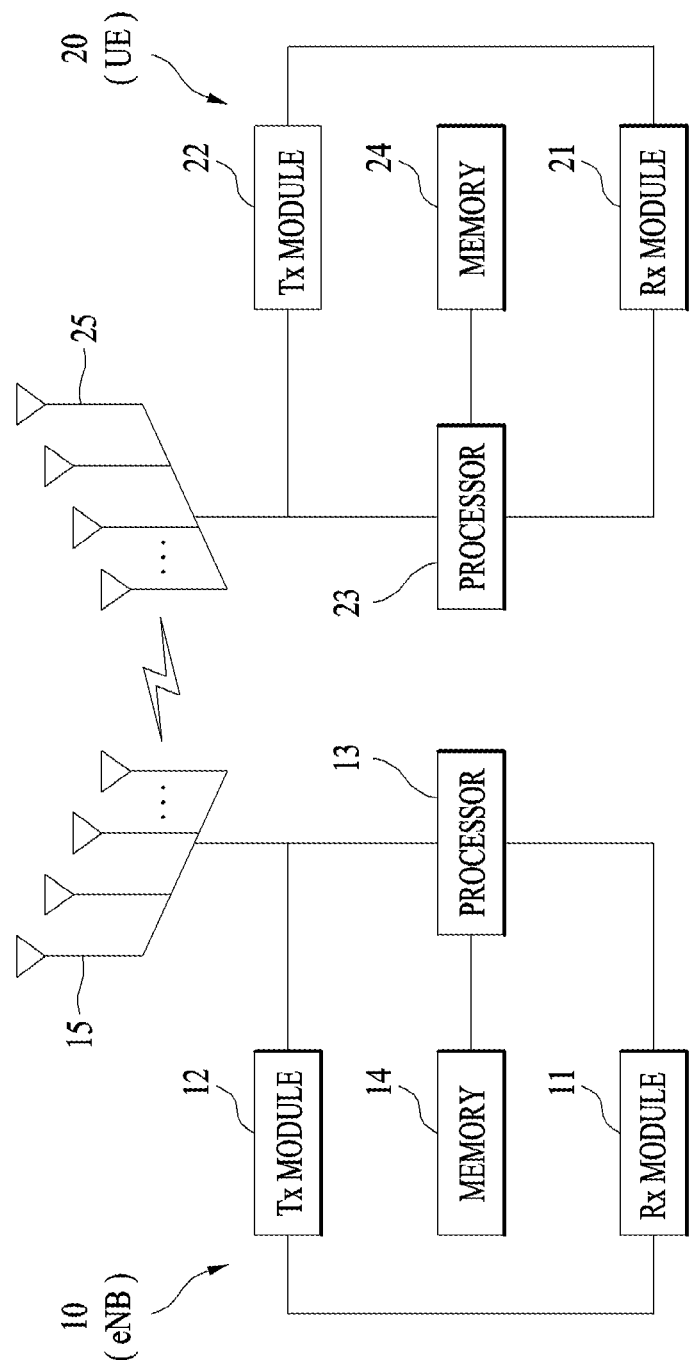
FIG. 13 is a diagram showing the configuration of transmission and reception apparatuses.

FIG. 13 is a block diagram of a transmission point and a UE according to an embodiment of the present invention.

Referring to FIG. 13, a transmission point apparatus 10 according to the present invention may include an Rx module 11, a Tx module 12, a processor 13, a memory 14, and a plurality of antennas 15. The plurality of antennas 15 are used to support MIMO transmission and reception. The Rx module 11 may receive uplink signals, data and information from a UE. The Tx module 12 may transmit downlink signals, data and information to a UE. The processor 13 may provide overall control to the operations of the transmission point apparatus 10.

In accordance with an embodiment of the present invention, the processor 13 of the transmission point apparatus 10 may process necessary information in the afore-described embodiments.

Besides, the processor 13 of the transmission point apparatus 10 processes information received by the transmission point apparatus 10 and information to be transmitted to an external device. The memory 14 may store the processed information for a predetermined time and may be replaced with a component such as a buffer (not shown).

Referring to FIG. 13, a UE apparatus 20 according to the present invention may include an Rx module 21, a Tx module 22, a processor 23, a memory 24, and a plurality of antennas 25. The plurality of antennas 25 are used to support MIMO transmission and reception. The Rx module 21 may receive downlink signals, data and information from an eNB. The Tx module 22 may transmit uplink signals, data and information to an eNB. The processor 23 may provide overall control to the operations of the UE apparatus 20.

In accordance with an embodiment of the present invention, the processor 23 of the UE apparatus 20 may process necessary information in the afore-described embodiments.

Besides, the processor 23 of the UE apparatus 20 processes information received by the UE apparatus 20 and information to be transmitted to an external device. The memory 24 may store the processed information for a predetermined time and may be replaced with a component such as a buffer (not shown).

One or more of the above-described embodiments of the present invention may apply to the configurations of the transmission point apparatus and the UE apparatus, independently or in combination. Redundant descriptions are avoided for clarity.

The description of the transmission point apparatus 10 may apply to a relay as a downlink transmission entity or an uplink reception entity, and the description of the UE apparatus 20 may apply to the relay as a downlink reception entity or an uplink transmission entity in FIG. 13.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the afore-mentioned processor via a variety of well-known parts.

The detailed description of the exemplary embodiments of the present invention has been given to enable those skilled in the art to implement and practice the invention.

Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method of receiving a downlink signal at a user equipment (UE) in a wireless communication system, the method comprising:
    receiving interference information on a PRB (Physical Resource Block) pair used to transmit the downlink signal from a serving cell;
    determining a first resource region in the PRB pair in which the UE performs interference cancellation; and
    performing interference cancellation in the first resource region based on the interference information, the interference information being of a second resource region,
    wherein the second resource region corresponds to the first resource region,
    wherein the interference information includes use of each of information of PRB pairs, transmission type information, and information on whether an interference of the second region is homogeneous to an interference of the first resource region, and
    wherein the UE performs interference cancellation only in the first resource region corresponding to a physical downlink shared channel (PDSCH) or enhanced physical downlink control channel (EPDCCH) allocated region of the second resource region.

2. The method according to claim 1, wherein, if each PRB pair is used for the EPDCCH, the EPDCCH transmission type is a localized transmission type and interference is not homogeneous, the UE performs energy detection in enhanced control channel element (ECCE) units, for interference cancellation.

3. The method according to claim 1, wherein, if each PRB pair is used for the EPDCCH, the EPDCCH transmission type is a localized transmission type and interference is homogeneous, the UE performs interference cancellation regardless of an aggregation level and antenna port of an EPDCCH via which control information is transmitted.

4. The method according to claim 1, wherein the downlink signal is one of an EPDCCH or a PDSCH.

5. The method according to claim 4, wherein, if each PRB pair is used for the PDSCH, the UE performs interference cancellation regardless of an aggregation level and antenna port of an EPDCCH via which control information is transmitted.

6. The method according to claim 4, wherein the interference information further includes port information used to transmit an EPDCCH by the neighbor cell in each PRB pair.

7. The method according to claim 4, wherein interference information further includes information related to amount of resource elements used to transmit an EPDCCH by the neighbor cell.

8. The method according to claim 4, wherein the interference information includes a cyclic shift type, a subframe type, a channel state information-reference signal (CSI-RS) configuration and a number of EPDCCH symbols.

9. The method according to claim 4, wherein the interference information is determined according to capability information of the UE and the capability information includes a number of types of interference to be cancelled by the UE in one PRB pair.

10. The method according to claim 4, wherein the interference information further includes a scrambling sequence parameter used by the neighbor cell.

11. The method according to claim 10, wherein the scrambling sequence parameter includes one or both of a cell identifier (ID) and a UE ID.

12. A user equipment (UE) apparatus is in a wireless communication system, the UP apparatus comprising:
    a receiver; and
    a processor,
    wherein the processor configured to:
        control the receiver to receive interference information on a PRB (Physical Resource Block) pair used to transmit the downlink signal from a serving cell,
        determine a first resource region in the PRB pair in which the UE apparatus performs interference cancellation, and
        perform interference cancellation in the first resource region based on the interference information, the interference information being of a second resource region,
    wherein the second resource region corresponds to the first resource region,
    wherein the interference information includes use of each of information of PRB pairs, transmission type information, and information on whether an interference of the second resource region is homogeneous to an interference of the first resource region, and
    wherein the processor performs interference cancellation only in the first resource region corresponding to a physical downlink control channel (PDCCH) or enhanced physical downlink control channel (EPDCCH) allocated region of the second resource region.

* * * * *